United States Patent
Ficet et al.

(10) Patent No.: US 10,341,139 B2
(45) Date of Patent: Jul. 2, 2019

(54) METHOD OF REMOTE MONITORING AND REMOTE CONTROL OF A CLUSTER USING A COMMUNICATION NETWORK OF INFINIBAND TYPE AND COMPUTER PROGRAM IMPLEMENTING THIS METHOD

(71) Applicant: BULL SAS, Les Clayes sous Bois (FR)

(72) Inventors: Jean-Vincent Ficet, La Chapelle Blanche (FR); Sébastien Dugue, Saint Theoffrey (FR); Jean-Olivier Gerphagnon, Vif (FR)

(73) Assignee: BULL SAS, Les Clayes sous Bois (FR)

( * ) Notice: Subject to any disclaimer, the term of this patent is extended or adjusted under 35 U.S.C. 154(b) by 26 days.

(21) Appl. No.: 15/524,498

(22) PCT Filed: Nov. 3, 2015

(86) PCT No.: PCT/FR2015/052970
§ 371 (c)(1),
(2) Date: May 4, 2017

(87) PCT Pub. No.: WO2016/071628
PCT Pub. Date: May 12, 2016

(65) Prior Publication Data
US 2017/0317848 A1 Nov. 2, 2017

(30) Foreign Application Priority Data
Nov. 6, 2014 (FR) ...................................... 14 60723

(51) Int. Cl.
*H04L 12/46* (2006.01)
*H04L 12/26* (2006.01)
(Continued)

(52) U.S. Cl.
CPC ...... *H04L 12/4633* (2013.01); *H04L 12/4604* (2013.01); *H04L 12/4625* (2013.01);
(Continued)

(58) Field of Classification Search
CPC ............. H04L 12/4633; H04L 12/4604; H04L 12/2834; H04L 12/283; H04L 12/4625;
(Continued)

(56) References Cited

U.S. PATENT DOCUMENTS 6,496,862 B1 * 12/2002 Akatsu ................ H04L 12/2803
709/224
2004/0213220 A1 * 10/2004 Davis .................. H04L 12/4604
370/389

(Continued)

FOREIGN PATENT DOCUMENTS

WO    WO 2009/029774 A1    3/2009

OTHER PUBLICATIONS

International Search Report as issued in International Patent Application No. PCT/FR2015/052970, dated Jan. 26, 2016.

*Primary Examiner* — Warner Wong
(74) *Attorney, Agent, or Firm* — Pillsbury Winthrop Shaw Pittman LLP

(57) ABSTRACT

A method of remote monitoring and remote control of a cluster including nodes connected to a communication network of a first type, a relay node of the nodes including first and second network interfaces in accordance with first and second types of communication network respectively, the first and second types being distinct, some steps of the monitoring and control method being implemented in a remote computer linked to the relay node by a communication network of the second type, the method including receiving a packet via the first network interface; encapsulating the received data packet in a data frame in accordance (Continued)

with a protocol of the communication network of the second type; sending the data frame to the remote computer via the second network interface, the receiving of the data packet, the encapsulating of the data packet and the sending of the data frame being implemented in the relay node.

10 Claims, 4 Drawing Sheets

(51) Int. Cl.
*H04L 12/721* (2013.01)
*H04L 12/70* (2013.01)
*H04L 29/06* (2006.01)
*H04L 29/12* (2006.01)

(52) U.S. Cl.
CPC .............. *H04L 43/08* (2013.01); *H04L 45/66* (2013.01); *H04L 29/06224* (2013.01); *H04L 29/06625* (2013.01); *H04L 29/12575* (2013.01); *H04L 65/102* (2013.01); *H04L 2012/5618* (2013.01)

(58) Field of Classification Search
CPC ....... H04L 12/66; H04L 43/08; H04L 65/105; H04L 29/06224; H04L 2012/5618; H04L 29/06625; H04L 29/12575; H04L 61/2592; H04L 47/825
See application file for complete search history.

(56) References Cited

U.S. PATENT DOCUMENTS

| | | | |
|---|---|---|---|
| 2005/0157729 A1* | 7/2005 | Rabie | H04L 12/5601 370/395.53 |
| 2006/0200584 A1* | 9/2006 | Bhat | H04L 12/4641 709/249 |
| 2006/0215657 A1* | 9/2006 | Lee | H04L 12/4633 370/389 |
| 2006/0259608 A1* | 11/2006 | Kim | H04L 12/4633 709/223 |
| 2009/0141728 A1* | 6/2009 | Brown | H04L 12/66 370/395.31 |
| 2009/0245251 A1* | 10/2009 | Koide | H04L 12/4633 370/390 |
| 2011/0222543 A1* | 9/2011 | Jiang | H04L 12/4633 370/392 |
| 2013/0131128 A1* | 5/2013 | Melani | A61K 31/41 514/365 |
| 2013/0315243 A1 | 11/2013 | Huang et al. | |
| 2016/0020922 A1* | 1/2016 | Sung | H04W 28/08 370/329 |
| 2016/0127270 A1* | 5/2016 | Yasuda | H04L 49/25 370/401 |
| 2016/0164699 A1* | 6/2016 | Ma | H04L 61/251 726/12 |
| 2016/0353353 A1* | 12/2016 | Sung | H04L 12/66 |

* cited by examiner

METHOD OF REMOTE MONITORING AND REMOTE CONTROL OF A CLUSTER USING A COMMUNICATION NETWORK OF INFINIBAND TYPE AND COMPUTER PROGRAM IMPLEMENTING THIS METHOD

CROSS-REFERENCE TO RELATED APPLICATIONS

This is the U.S. National Stage of PCT/FR2015/052970, filed Nov. 3, 2015, which in turn claims priority to French Patent Application No. 1460723, filed Nov. 6, 2014, the entire contents of all applications are incorporated herein by reference in their entireties.

The present invention relates to the monitoring and control of clusters, in particular clusters using an InfiniBand type communication network, and more particularly a method of remote monitoring and remote control of a cluster using an InfiniBand type communication network and a computer program implementing such a method.

High Performance Computing or HPC is being developed for both university research and industry, in particular in technical fields such as aeronautics, energy, climatology, and life sciences. Modeling and simulation make it possible in particular to reduce development costs and to accelerate the bringing to market of innovative products that are more reliable and consume less energy. For researchers, high performance computing has become an indispensable research tool.

Such computing is generally performed on data processing systems called clusters. A cluster typically comprises a group of interconnected nodes. Certain nodes are used to perform computing tasks (compute nodes), others nodes are used to store data (storage nodes) and another node normally manages the cluster (administration node). Each node is for example a server implementing an operating system such as Linux (Linux is a trademark). The connection between the nodes is, for example, made using Ethernet or InfiniBand communication links (Ethernet and InfiniBand are trademarks).

FIG. 1 schematically shows an example cluster topology 100, of the fat-tree type. The topology comprises a group of nodes generally referenced 105. Here, the nodes belonging to a group 110 are compute nodes and the nodes of a group 115 are service nodes (storage nodes and administration nodes). The compute nodes may be grouped together in sub-groups 120 termed "compute islets", the group 115 being termed a "service islet".

The nodes are linked together by switches, for example hierarchically. In the example shown in FIG. 1, the nodes are connected to first-level switches 125, which are linked to second-level switches 130, which in turn are linked to third-level switches 135.

As shown in FIG. 2, each node generally comprises one or more microprocessors, local memories, and a communication interface. More specifically, the device 200 here comprises a communication bus 202 to which are connected:
  Central Processing Units (CPUs) or microprocessors 204;
  Random Access Memory (RAM) component s206, comprising registers adapted to record variables and parameters created and modified during the execution of programs (as shown, each random access memory component may be associated with a microprocessor); and,
  communication interfaces 208 adapted to send and to receive data.

The node 200 furthermore comprises here internal storage means 212, such as hard disks, able in particular to contain the executable code of programs.

The communication bus allows communication and interoperability between the different elements included in the device 200 or connected thereto. The microprocessors 204 control and direct the execution of instructions or portions of software code of the program or programs. On powering up, the program or programs stored in a non-volatile memory, for example a hard disk, are transferred into the random access memory 206.

It is observed here that the cluster performance is directly linked to the choice of routes enabling data transfer between the nodes, the routes being established via communication links. In general terms, physical communication links are established between the nodes and the switches during the hardware configuration of a cluster, the communication routes themselves being determined in an initialization phase on the basis of a definition of the connections to be established between the nodes. According to the communication technology implemented, the configuration of the routes may be static or dynamic.

By way of illustration, the InfiniBand technology enables, in a cluster, a static configuration of the routes. This configuration uses static routing tables, known as Linear Forwarding Tables (LFTs), in each switch. When this technology is implemented, a routing algorithm such as FTree, MINHOP, UPDN or LASH may be used.

The choice of the algorithm to be used is typically made by an administrator based on the cluster topology in particular. It may, for example, be the FTree algorithm. However, if the chosen algorithm does not enable routing, the cluster manager (typically in charge of the routing) in general automatically chooses another algorithm, for example the MINHOP algorithm (which generally provides poorer performance than that initially chosen).

By way of illustration and in simplified manner, the FTree algorithm determines routes such that they are distributed as much as possible throughout existing communication links. For these purposes, at the time of the routing of a communication network fully connected in accordance with a fat-tree type architecture, each node of the network is considered to have the same importance. Thus, when a route is established between two nodes of a same link, the number of routes using that link, called the link load, is increased by one. When the routing algorithm seeks to establish a new route and several possibilities are available, the routing algorithm compares the loads associated with the links on which the possibilities are based and chooses the route whose links have the lowest load.

During use of the cluster, if a link or a component such as a node or a switch suffers a fault, new routing is carried out.

As the routing quality has a direct influence on the cluster performance, there is a need to monitor a routing configuration in a cluster comprising static communication links and, if required, warn an administrator of a potential routing problem.

As previously noted, the monitoring and control of a cluster, in particular of the switches, are typically carried out in centralized manner by a dedicated node, the administration node. Furthermore, this administration node executes services, for example database management services and management services of specific devices (e.g. devices that are not of InfiniBand type in an InfiniBand cluster).

The monitoring and control of a cluster of InfiniBand type are carried out using particular data packets, called MAD (acronym for MAnagement Datagrams). Thus, a monitoring and control device sends MAD type packets to InfiniBand type equipments of a cluster, typically switches or adaptors, which, in reply, send back MAD type reply packets to the monitoring and control sending device.

However, it has been observed that it can be useful, in particular during a cluster configuration phase or when problems occur, to provide, in addition to the administration node, monitoring and/or control means of a cluster that are at a distance or remote.

The invention enables at least one of the problems set forth above to be solved.

The invention thus relates to a method of remote monitoring and remote control of a cluster comprising a plurality of nodes connected to a communication network of a first type, a node of said plurality of nodes, called relay node, comprising a first network interface in accordance with said first type of communication network and a second network interface in accordance with a second type of communication network, said first and second types being distinct, some steps of said monitoring and control method being implemented in a remote computer linked to said relay node by a communication network of said second type, the method comprising the following steps:

receiving at least one data packet via said first network interface;

encapsulating said at least one received data packet in at least one data frame in accordance with a protocol of said communication network of said second type;

sending said at least one data frame to said remote computer via said second network interface, said steps of receiving at least one data packet, of encapsulating said at least one data packet and of sending said at least one data frame being implemented in said relay node.

The method according to the invention thus makes it possible to act remotely. It furthermore provides the possibility of performing a fine analysis of events in a cluster. Thus, for example, a simple portable computer linked to a cluster of InfiniBand type via an Ethernet link enables at least some parameters of a cluster to be monitored and managed.

According to a particular embodiment, the method further comprises the following steps, implemented in said relay node, receiving, via said second network interface, from said remote computer, at least one data frame comprising at least one data packet;

decapsulating said at least one received data frame to recover said at least one data packet contained in said at least one received data frame; and sending, via said first network interface, said at least one recovered data packet.

According to a particular embodiment, the method further comprises the following steps, implemented in said remote computer, receiving, from said relay node, at least one data frame comprising at least one data packet;

decapsulating said at least one data frame received from said relay node to recover said at least one data packet contained in said at least one data frame received from said relay node; and processing said at least one recovered data packet contained in said data frame received from said relay node, said steps of receiving said at least one data frame and said step of processing said at least one recovered data packet being implemented in a monitoring and control module configured to be implemented in a node of said cluster.

According to a particular embodiment, the method further comprises the following steps, implemented in said remote computer, receiving, from a monitoring and control module configured to be implemented in a node of said cluster, at least one data packet;

encapsulating said at least one data packet received from said monitoring and control module configured to be implemented in a node of said cluster, in at least one data frame in accordance with a protocol of said communication network of said second type;

sending, to said relay node, said at least one data frame comprising said at least one data packet received from said monitoring and control module configured to be implemented in a node of said cluster.

According to a particular embodiment, the method further comprises a prior step of storing, in said relay node, an address of said remote computer, said stored address of said remote computer being used to encapsulate at least one data packet to send to said remote computer in the form of at least one data frame.

According to a particular embodiment, the method further comprises a step of storing, in said remote computer, an address of said relay node, said stored address of said relay node being used to encapsulate at least one data packet to send to said relay node in the form of at least one data frame.

According to a particular embodiment, at least one data packet sent from said relay node to said remote computer is a data packet of particular type comprising information relative to said cluster.

According to a particular embodiment, said first type of communication network is of InfiniBand type and according to which said second type of communication network is of Ethernet type.

The invention is also directed to a computer program comprising instructions adapted to the implementation of each of the steps of the method described earlier when said program is executed on a computer as well as to a system comprising at least one relay node and at least one remote computer comprising means configured to implement each of the steps of the method described earlier.

The advantages procured by that computer program and this system are similar to those referred to above.

Other advantages, objects and features of the present invention will emerge from the following detailed description, given by way of non-limiting example, relative to the accompanying drawings in which.

Figure 4A:
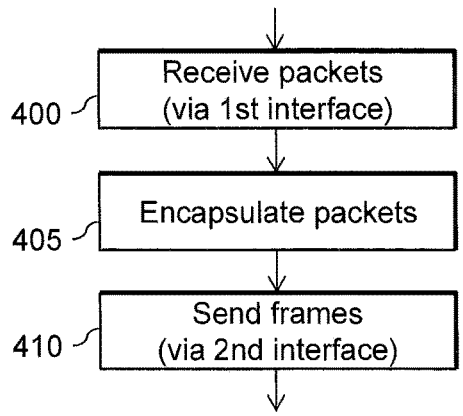
Figure 4B:
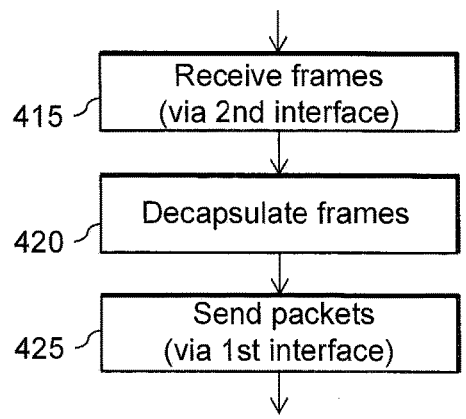
Figure 5A:
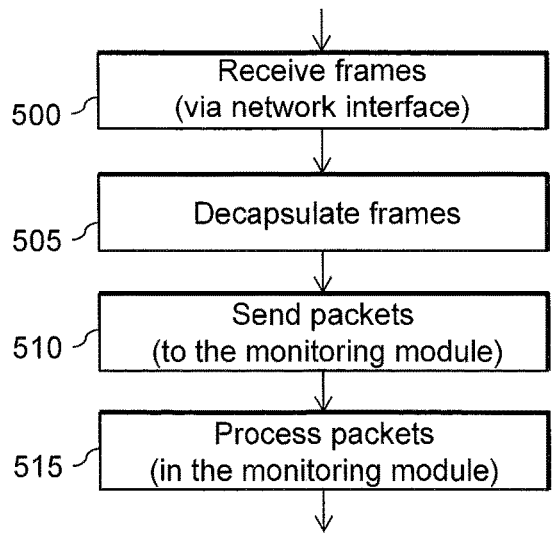
Figure 5B:
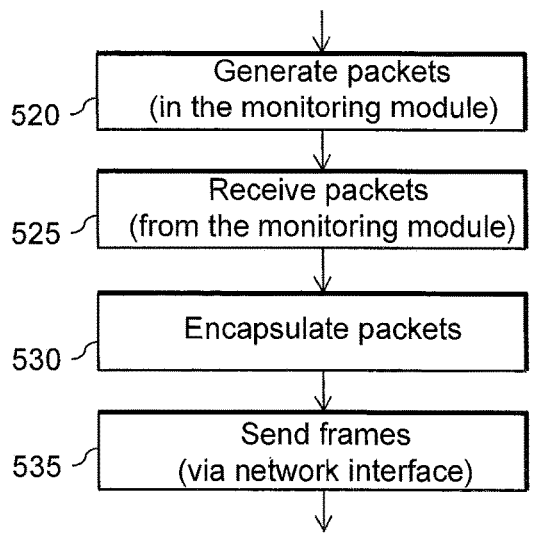

FIG. 4, comprising FIGS. 4a and 4b, schematically shows steps implemented in a node of a cluster also linked to a communication network of a type that is different from that of the cluster, to send monitoring data to a remote device (FIG. 4a) and to receive control data from that remote device (FIG. 4b); and FIG. 5, comprising FIGS. 5a and 5b, schematically shows steps implemented in a remote computer linked to a relay node of a cluster, to receive and process monitoring data from the relay node (FIG. 5a) as well as to generate and send control data to the relay node (FIG. 5b).

In general, according to a particular embodiment, the invention aims to establish a gateway between the communication network of a cluster, for example an InfiniBand type communication network, and a communication network of a general public type, for example Ethernet.

Figure 3:
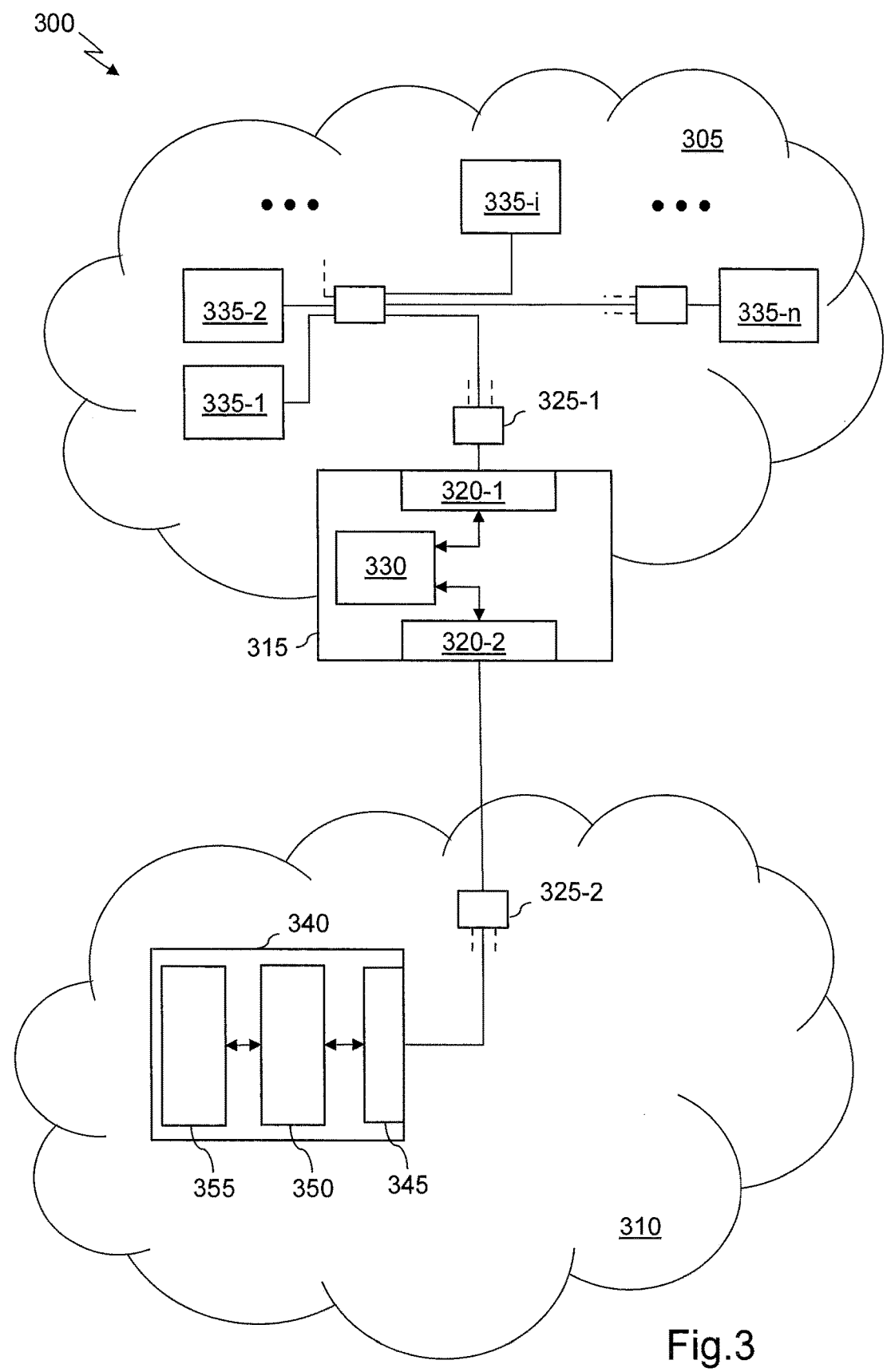
FIG. 3 shows an example implementation of the invention according to a particular embodiment.

FIG. 3 shows an example implementation of the invention according to a particular embodiment.

The environment 300 in which the embodiment is implemented here comprises a first group 305 of devices that are connected to a same communication network of a first type, for example of InfiniBand type, and a second group 310 of devices connected to a communication network of a second type, different from the first, for example of Ethernet type.

As shown, the device 315 is linked to the communication network of the first type and to the communication network of the second type (e.g. InfiniBand and Ethernet) via its network interfaces 320-1 and 320-2 and via switches 325-1 and 325-2, respectively.

This device makes it possible to establish a gateway between the two communication networks. For these purposes, it comprises a relay module 330, typically a software module.

The device 315 can thus exchange data with devices 335-1 to 335-n using the communication network of the first type (e.g. InfiniBand) and with a device 340 using the communication network of the second type (e.g. Ethernet).

The device 315, termed relay node in the following, is typically an administration node.

A relay module 330, implemented in the server, makes it possible to send data received by the relay node 315 by one of the network interfaces on the other network interface and vice-versa.

The relay module 330 thus makes it possible to send data, in the form of packets (e.g. packets of the MAD type), from a device linked to the communication network of the first type (e.g. InfiniBand), to the device 340 of which an identifier, for example an IP address, has been obtained in advance or is dynamically obtained. The received data packets are, according to a particular embodiment, sent in the form of frames after an encapsulating step.

In return, the relay module 330 enables data received by the relay node 315, in the form of frames, to be sent from the device 340, to a device linked to the communication network of the first type (e.g. InfiniBand). An identifier of the device or devices to which received data must be sent in the form of packets (e.g. packets of MAD type), is preferably sent in the received frames (typically in data packets sent in the frames).

According to a particular embodiment, the received frames are decapsulated to recover packets encapsulated beforehand to send over the communication network of the first type, these data packets comprising identifiers of the recipient or recipients.

The monitoring and control device 340 is typically a personal computer, for example of the portable Personal Computer or PC type. It comprises a network interface 345, a relay module 350, and a monitoring and control module 355. These two modules are typically software modules.

The monitoring and control module 355 is here a standard monitoring and control module, generally used in an administration node to monitor and control the proper execution of certain operations carried out in a cluster.

It is thus typically designed to directly process data packets received from the communication network of the cluster, that is to say here from the InfiniBand type communication network, in particular packets of MAD type.

The relay module 350 implemented in the monitoring and control device 340 makes it possible to send data received from the relay node 315, for example in the form of frames, to the monitoring and control module 355. To this end, the received frames are, according to a particular embodiment, decapsulated to address the data contained in those frames in the form of packets (e.g. packets of MAD type) to the monitoring and control module 355.

In return, the relay module 350 makes it possible to send data received from the monitoring and control module 355, for example in the form of packets (e.g. packets of MAD type), to the relay node 315, for example in the form of frames.

According to a particular embodiment, an identifier (for example an IP address) of the relay node 315 to which the received data must be sent is obtained in advance or is dynamically obtained. Still according to a particular embodiment, the packets received are encapsulated in order to be sent in the form of frames.

The relay module 350 thus makes it possible to "deceive" the monitoring and control module 355, which acts as if it were implemented in a device directly linked to the communication network of the cluster, for example an InfiniBand type communication network. This module may be implemented in the form of a particular library or thanks to an overloading function by using an environment variable known as LD_PRELOAD in the Unix environment (Unix is a trademark).

Still according to a particular embodiment, the relay module 330 is a daemon, that is to say a process that runs in the background, executed by a node having at least two network interfaces, to receive data over a network interface and send them over another network interface.

Control data packets of the cluster (e.g. packets of MAD type) may be received from an InfiniBand type communication network, encapsulated in frames, and sent over a communication network of the Ethernet type. In return, data frames may be received from a communication network of Ethernet type, decapsulated, and sent in the form of packets (e.g. packets of MAD type) over an InfiniBand type communication network.

The data packets received from the InfiniBand type communication network may be received by a device of the cluster in response to a prior request, for example a request coming from the monitoring and control device, or autonomously.

Similarly, the data packets issued by the monitoring and control module to one or more devices of the cluster may be issued in response to data received beforehand from one or more devices of the cluster, or autonomously.

FIG. 4, comprising FIGS. 4a and 4b, schematically shows steps implemented in a cluster node also linked to a communication network of a type that is different from that of the cluster, to send monitoring data to a remote device (steps 400 to 410 of FIG. 4a) and to receive control data from that remote device (steps 415 to 425 of FIG. 4b). The node implementing steps 400 to 425 is, for example, the relay node 315 described with reference to FIG. 3.

Steps 400 to 410 and steps 415 to 425 are executed in distinct manner, typically in parallel.

As shown, to send control data of a cluster between a device of that cluster and a remote device (i.e. not directly linked to the cluster), a first step is directed to receiving the data (step 400).

According to a particular embodiment, the data exchanged between the devices of the cluster are sent in the form of packets comprising a recipient identifier. This identifier may be linked to a single device (a unicast transmission) or to several devices (a multicast transmission). A device identifier may, for example, be a local address, for example an address known by the name LID.

According to this embodiment, the data received during step 400 are packets comprising, as recipient, the identifier of the relay node implementing steps 400 to 410. These packets are received by a first network interface of the relay node, for example an interface of the InfiniBand type.

In a following step (step 405), the received data are encapsulated in one or more data frames of which the format is defined in a protocol implemented in the communication network linking the relay node implementing steps 400 to 410 and the device to which the data must be sent (i.e. the device used to monitor and control the cluster).

These frames comprise an identifier of the device to which the data must be sent, for example the Internet Protocol or IP address of the network interface used by that device. According to a particular embodiment, this identifier is stored in advance in the relay node.

The data to send are encapsulated and then sent (step 410) via a second network interface of the relay node implementing steps 400 to 410, providing access to the communication network linking the node to the device to which the data are to be sent, for example a communication network of the Ethernet type.

In parallel, to send control data of a cluster between a remote device (i.e. not directly linked to the cluster) and a device of the cluster, a first step relates to receiving the data (step 415).

According to a particular embodiment, the data exchanged between the remote device and the node of the cluster implementing steps 415 to 425 (i.e. the relay node) are sent in the form of frames encapsulating the data to exchange. The frames may themselves be organized into data packets, the frames comprising an identifier of the relay node. The identifier may, for example, be the IP address of the second network interface of the relay node.

In a following step (step 420), the data received in the form of frames are decapsulated so that the data may be recovered in a format compatible with the communication network of the cluster, typically data packets comprising an identifier of one or more devices in the cluster.

The data to be sent are decapsulated and then sent (step 425) via the first network interface of the relay node, providing access to the communication network of the duster.

FIG. 5, comprising FIGS. 5*a* and 5*b*, schematically shows steps implemented in a remote computer linked to a relay node of a cluster, to receive and process monitoring data of the relay node (steps 500 to 515 of FIG. 5*a*) as well as to generate and send control data to the relay node (steps 520 to 535 of FIG. 5*b*).

The device implementing steps 500 to 535 is, for example, the device 340 described with reference to FIG. 3.

Similarly to steps 400 to 410 and steps 415 to 425, steps 500 to 515 and steps 520 to 535 are executed in a distinct manner, typically in parallel.

As shown, to process (and typically to analyze) the data enabling a cluster to be monitored and controlled from a remote computer (i.e. not directly linked to the cluster), a first step relates to receiving data sent by the relay node (step 500).

These data are received by a network interlace of the remote computer, the network interface linking the remote computer to a relay node via a communication network (e.g. communication network of the Ethernet type).

According to a particular embodiment, the data exchanged between the relay node and the remote computer are sent in the form of frames, for example Ethernet frames, comprising one or more data packets. Each frame comprises an identifier of the remote computer, for example the IP address of its network interface.

In a following step (step 505), the data received are decapsulated so that the original data (i.e. prior to encapsulation) may be recovered, in accordance with the communication protocol used by the cluster, for example data packets in accordance with the InfiniBand standard.

The recovered data are then sent to a monitoring and control module of the remote computer (step 510) and are processed thereby (step 515).

As described above, the monitoring and control module is, according to a particular embodiment, a monitoring and control module configured to be implemented on a node of the cluster. In other words, the monitoring and control module is configured to process the data in accordance with a protocol used by the communication network of the cluster.

In parallel, in order to send control data of a cluster between the remote device and a device of that cluster, a first step relates to generating the control data (step 520).

These data are typically generated in the monitoring and control module that processed the data received from the cluster in advance (these latter having typically been received in response to an earlier request).

After receipt (step 525), for example from the monitoring and control module, the control data are encapsulated in one or more data frames of which the format is defined by the protocol implemented in the communication network linking the remote computer to the relay node (step 530).

They are, for example, Ethernet frames. They comprise an identifier of the relay node to which the data must be sent, for example its IP address obtained in advance by the remote computer.

The encapsulated data are then sent by the remote computer, via a network interface, to the relay node (step 535), which then transfers them to the communication network of the cluster as described with reference to FIG. 4*b*.

Figure 1:
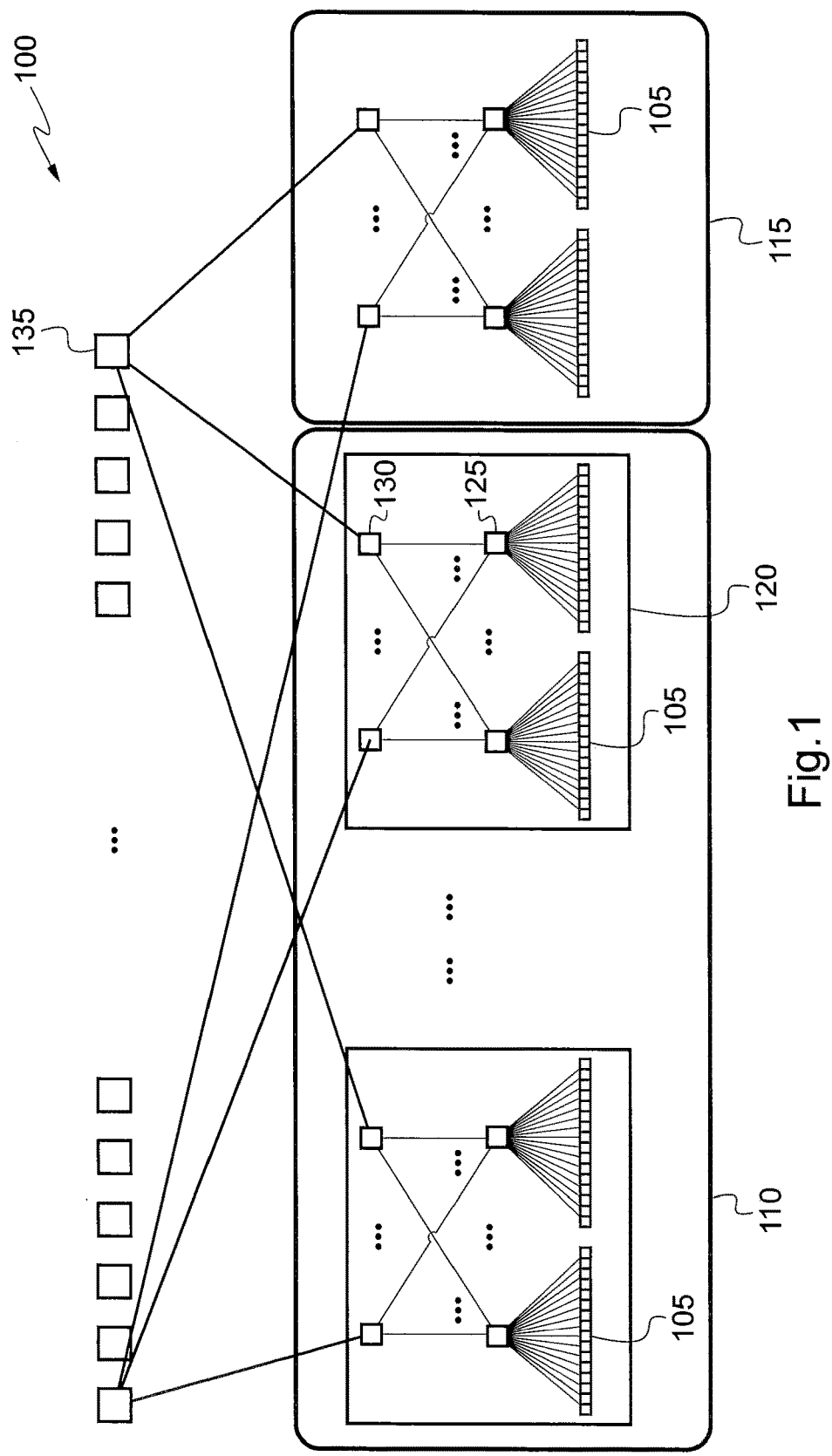
FIG. 1 shows an example cluster topology.
Figure 2:
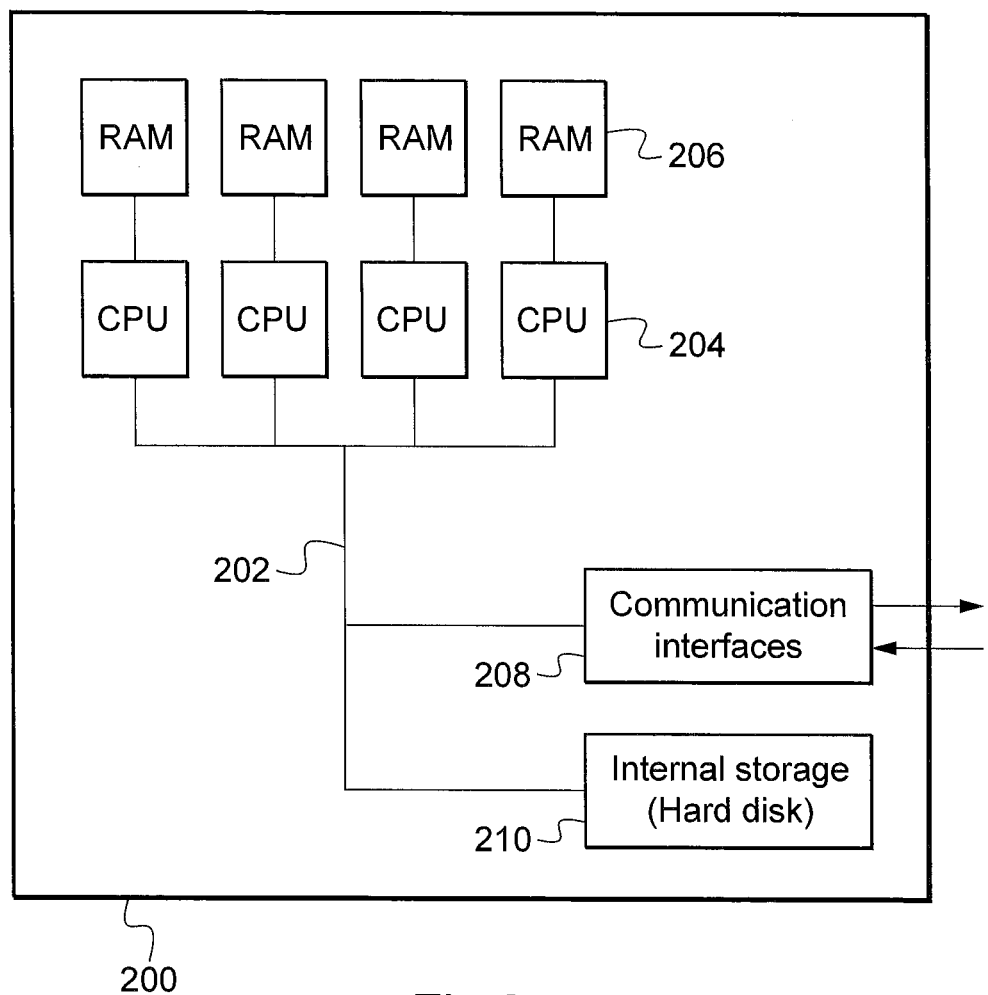
FIG. 2 shows an example architecture of a node of a cluster.

It should be noted that the algorithms described with reference to FIGS. 4 and 5 may, for example, be implemented in a device similar to that described with reference to FIG. 2, in the form of a computer program.

Naturally, to satisfy specific needs, a person skilled in the art will be able to apply modifications to the preceding description.

The invention claimed is:

1. A method of remote monitoring and remote control of a cluster comprising a plurality of nodes connected to a communication network of InfiniBand type, a relay node of said plurality of nodes comprising a first network interface compliant with said InfiniBand type communication network and a second network interface compliant with a communication network of Ethernet type, said relay node being linked to a remote computer by said communication network of Ethernet type, the method comprising:

receiving, by the relay node, at least one monitoring data packet via said first network interface;

encapsulating, by the relay node, said at least one monitoring received data packet in at least one monitoring data frame in accordance with a protocol of said communication network of Ethernet type;

sending, by the relay node, said at least one monitoring data frame to said remote computer via said second network interface, wherein the remote computer implements a monitoring and control module and a relay module configured to transmit data received from the relay node to the monitoring and control module, so that the relay module is configured to deceive the monitoring and control module which acts as if it was implemented in a device directly linked to the InfiniBand type communication network.

2. The method according to claim 1, further comprising:
receiving, by the relay node, via said second network interface, from said remote computer, at least one control data frame comprising at least one control data packet;
decapsulating, by the relay node, said at least one received control data frame to recover said at least one control data packet contained in said at least one received data frame; and
sending, by the relay node, via said first network interface, said at least one recovered control data packet.

3. The method according to claim 1 further comprising:
receiving, by the remote computer, from said relay node, at least one data frame comprising at least one data packet;
decapsulating, by the remote computer, said at least one data frame received from said relay node to recover said at least one data packet contained in said at least one data frame received from said relay node; and
processing, by the remote computer, said at least one recovered data packet contained in said at least one data frame received from said relay node, said processing of said at least one recovered data packet being implemented in the monitoring and control module, said monitoring and control module being configured to process data in accordance with a protocol used by the InfiniBand type communication network.

4. The method according to claim 1 further comprising the following steps, which are implemented in said remote computer:
receiving, from said monitoring and control module configured to be implemented in a node of said cluster, at least one data packet;
encapsulating said at least one data packet, received from said monitoring and control module configured to be implemented in the node of said cluster, in at least one data frame in accordance with a protocol of said communication network of Ethernet type;
sending, to said relay node, said at least one data frame comprising said at least one data packet received from said monitoring and control module configured to process data in accordance with a protocol used by the InfiniBand type communication network.

5. The method according to claim 1 further comprising, prior to said receiving at least one data packet, storing, in said relay node, an address of said remote computer, said stored address of said remote computer being used to encapsulate at least one data packet to send to said remote computer in the form of at least one data frame.

6. The method according to claim 1 further comprising storing, in said remote computer, an address of said relay node, said stored address of said relay node being used to encapsulate at least one data packet to send to said relay node in the form of at least one data frame.

7. The method according to claim 1 wherein at least one data packet sent from said relay node to said remote computer is a data packet of management datagram (MAD) type comprising information relative to said cluster.

8. A non-transitory computer readable medium including a program comprising instructions adapted for the carrying out of each step of the method according to claim 1 when said program is executed on a computer.

9. A system comprising at least one relay node and at least one remote computer comprising one or more components configured to carry out each step of the method according to claim 1.

10. The method according to claim 1, wherein the monitoring and control module is configured to monitor and control the cluster of nodes.

* * * * *